(12) United States Patent
Lewis (10) Patent No.: US 7,649,914 B2
(45) Date of Patent: Jan. 19, 2010

(54) OPTICAL FIBRE LASER (75) Inventor: Steffan Lewis, Reading (GB)

(73) Assignee: GSI Group Ltd. (GB)

( * ) Notice: Subject to any disclaimer, the term of this patent is extended or adjusted under 35 U.S.C. 154(b) by 0 days.

(21) Appl. No.: 12/060,444

(22) Filed: Apr. 1, 2008

(65) Prior Publication Data
US 2008/0219299 A1 Sep. 11, 2008

Related U.S. Application Data (63) Continuation of application No. PCT/GB2006/050328, filed on Oct. 16, 2006.

(51) Int. Cl.
*H01S 3/30* (2006.01)
*H01S 3/098* (2006.01)

(52) U.S. Cl. ............................. 372/6; 372/18
(58) Field of Classification Search ............ 372/6, 372/18
See application file for complete search history.

(56) References Cited

U.S. PATENT DOCUMENTS

| | | |
|---|---|---|
| 4,553,238 A | 11/1985 | Shaw et al. |
| 4,680,767 A | 7/1987 | Hakimi et al. |
| 4,712,075 A | 12/1987 | Snitzer |
| 4,780,877 A | 10/1988 | Snitzer |
| 4,782,491 A | 11/1988 | Snitzer |
| 4,815,079 A | 3/1989 | Snitzer et al. |
| 4,818,062 A | 4/1989 | Scifres et al. |
| 4,829,529 A | 5/1989 | Kafka |
| 5,121,460 A | 6/1992 | Tumminelli et al. |
| 5,170,458 A | 12/1992 | Aoyagi et al. |
| 5,237,576 A | 8/1993 | DiGiovanni et al. |
| 5,268,978 A | 12/1993 | Po et al. |
| 5,317,576 A | 5/1994 | Leonberger et al. |
| 5,418,880 A | 5/1995 | Lewis et al. |
| 5,473,622 A | 12/1995 | Grubb |
| 5,666,372 A | 9/1997 | Ball et al. |
| 5,696,782 A | 12/1997 | Harter et al. |
| 5,805,621 A | 9/1998 | Grubb et al. |
| 5,818,630 A | 10/1998 | Fermann et al. |
| 5,864,644 A | 1/1999 | DiGiovanni et al. |

(Continued)

FOREIGN PATENT DOCUMENTS

| | | |
|---|---|---|
| EP | 0980122 | 2/2000 |
| EP | 1063742 | 12/2000 |
| WO | WO0191252 | 11/2001 |
| WO | WO0250964 | 6/2002 |

OTHER PUBLICATIONS

A. Galvanauskas et al., "Generation of high-energy femtosecond pulses in multimode-core TB-fiber chirped-pulse amplification systems," Optics Letters, vol. 26, No. 12, Jun. 15, 2001, pp. 935-937.*

(Continued)

*Primary Examiner*—Armando Rodriguez
(74) *Attorney, Agent, or Firm*—Gauthier & Connors LLP (57) ABSTRACT

A fiber laser is disclosed comprising a single mode or low-order-mode cladding pumped fiber laser oscillator or preamplifier, a cladding pumped fiber laser power amplifier to guide multiple transverse modes, wherein an output from the oscillator or preamplifier is applied through a mode mixing means to the power amplifier to provide that a laser signal of the cladding pumped fiber laser power amplifier is emitted from the fiber laser power amplifier in the multiple transverse modes.

20 Claims, 5 Drawing Sheets

U.S. PATENT DOCUMENTS

| | | | |
|---|---|---|---|
| 5,966,491 | A | 10/1999 | DiGiovanni |
| 5,999,673 | A | 12/1999 | Valentin et al. |
| 6,031,849 | A | 2/2000 | Ball et al. |
| 6,052,392 | A | 4/2000 | Ueda et al. |
| 6,324,326 | B1 | 11/2001 | Dejneka et al. |
| 6,434,302 | B1 | 8/2002 | Fidric et al. |
| 6,496,301 | B1 | 12/2002 | Koplow et al. |
| 6,603,905 | B1 | 8/2003 | Ionov |
| 6,625,354 | B2 | 9/2003 | Hollister et al. |

OTHER PUBLICATIONS

E. Rochat et al., "All-Fiber Phase-Modulated Master Oscillator Power Amplifier for Coherent Communication," IEEE Photonics Technology Letters, vol. 12, No. 9, Sep. 2000, pp. 1162-1164.

A. Galvanauskas et al., "Generation of high-energy femtosecond pulses in multimode-core TB-fiber chirped-pulse amplification systems," Optics Letters, vol. 26, No. 12, Jun. 15, 2001, pp. 935-937.

* cited by examiner

Fused fibre multimode pump combiner | Fused fibre pump combiner with single-mode or low-order-mode feedthrough

OPTICAL FIBRE LASER

PRIORITY

This application is a continuation application of and claims priority to PCT/GB2006/050328 filed Oct. 15, 2006, which claims priority to GB Application No. 0520853.3 filed on Oct. 14, 2005.

BACKGROUND

Lasers are used for a wide variety of applications including materials processing such as cutting, welding, drilling etc. More recently, optical fibre lasers have been developed where the active lasing element has been introduced into the core of the optical fibre itself and the pumping means necessary for establishing the laser action is introduced via the fibre cladding. Pumping energy (generally light) is applied via the waveguide formed by the inner and outer claddings and the core of the optical fibre is doped with a laser element such as a rare earth element. Pump light is absorbed by the active element in the core when rays of the cladding pump light intersect it. A laser oscillator is defined by two refractive index grating reflectors (Bragg grating) at either end of the fibre which is doped with the laser active iron (rare earth element).

The key elements of such a fibre are therefore the pump source, pump coupling and a cladding pumped fibre. Alternatively, a fibre laser may be formed by using as an input a seed source such as a semi-conductor laser diode or another fibre laser and using this to seed a series of optical fibre amplifiers.

High power fibre lasers of this type have applications in materials processing and also in telecommunications. To date, high power cladding pumped fibre lasers have concentrated on single-transverse-mode operation of the optical fibre gain medium. This has the advantage that the laser can have very good beam quality. However, there is a drawback with this scheme that, due to the small diameter of the core of the fibre that is required for single-transverse-mode operation, very high brightness pump sources (typically semi-conductor lasers) are required.

There is a need, therefore, for an improved cladding pumped optical fibre laser that overcomes the above limitations.

SUMMARY

The invention provides a fibre laser comprising a single mode or low-order-mode cladding pumped fibre laser oscillator or preamplifier, a cladding pumped fibre laser power amplifier to guide multiple transverse modes, wherein an output from the oscillator or preamplifier is applied through a mode mixing means to the power amplifier to provide that a laser signal of the cladding pumped fibre laser power amplifier is emitted from the fibre laser power amplifier in the multiple transverse modes. In accordance with further embodiments, the laser power amplifier is of greater core and cladding diameter than the oscillator or preamplifier, thus enabling lower brightness pump sources to be employed.

BRIEF DESCRIPTION OF THE DRAWINGS

Embodiments of the invention will now be described, by way of example only, with reference to the accompanying drawings in which.

DETAILED DESCRIPTION

According to the present invention there is provided a fibre laser comprising a single-mode or low-order mode laser oscillator or preamplifier for outputting a laser beam signal; a power amplifier adapted to guide multiple-transverse modes formed by an active fibre having a core and an inner cladding defining a waveguide for the laser signal, and an outer cladding defining a waveguide for pumping energy; wherein the core and inner cladding diameter of the power amplifier are substantially larger than the core and inner cladding of the oscillator or preamplifier.

The use of a larger diameter power amplifier enables the use of lower brightness pump sources (kiwould be required with prior art fibre laser) while achieving the required total pump power. The oscillator or preamplifier is typically pumped by lower power pump sources.

In a further aspect the invention provides a fibre laser comprising a fibre coupled semiconductor laser diode, single mode or low order mode laser preamplifier means for outputting a laser beam signal; a power amplifier comprising a cladding pumped optical fibre having a core and inner cladding defining a waveguide for the laser signal and an outer cladding defining a waveguide for pumping energy, wherein the core and inner cladding diameter of the power amplifier are respectively substantially larger than the core and inner cladding of the preamplifier.

Preferably, an intermediate section of mode-mixing optical fibre is provided, between the single mode or low order mode fibre and the multiple mode amplifier to ensure that most or all possible modes in the amplifier are filled for efficiency and to ensure repeatable performance.

In the forward direction, the mode-mixing optical fibre has the effect of filling the aperture of the multi-mode fibre which can be advantageous for the performance of the multi-mode amplifier. In the reverse direction, any light entering the mode-mixing optical fibre from the direction of the power amplifier will also be re-distributed to fill the aperture of the mode-mixing fibre.

The invention further provides a fibre laser comprising a single mode or low-order-mode cladding pumped fibre laser oscillator or preamplifier, and a cladding pumped fibre laser power amplifier adapted to guide multiple transverse modes, wherein an output from the oscillator or preamplifier is applied through a mode mixing means to the power amplifier.

Preferably, a cladding mode stripper is provided before the power amplifier. The mode-mixing optical fibre preferably has a core having a non-circular (e.g., faceted, for example hexagonal) cross-section to induce mode-mixing. Alternatively, the mode-mixing optical fibre means may have a circular core and have one or more twists or bends to induce mode-mixing, or may have other means for inducing mode-mixing. It may, of course, combine bends with a non-circular core.

The cladding mode stripper may comprise a capillary mounted generally co-axial with and along part of the length of the mode-mixing fibre and having an end which is slanted relative to the longitudinal axis of the capillary.

The inner cladding of the master oscillator or preamplifier may have a non-circular cross-section.

Presently available single-mode and low-order-mode fibres have inner cladding diameters ranging from about 125-400 microns. The corresponding core diameters range from about 4-30 microns.

To make a mid-power laser (250-1000 W) these conventional fibres require a certain level of pump brightness. Essentially, brightness=power/(area×(NA$^2$)), where NA is the numerical operative of a waveguide. Significantly lower cost pump sources are available with about 4 times lower brightness. A 4 times increase in inner cladding cross-sectional area would accommodate this pump source—or a ~2 times increase in cladding diameter up to around 800 microns or a little more. Thus, enlargement of both the core and cladding of the multimode amplifier to dimensions substantially larger than fibres currently used for this application, enables the use of lower brightness pump sources while maintaining the preferred pump absorption.

According to the present invention in a further aspect there is provided a fibre laser comprising a single-mode or low-order mode laser oscillator or preamplifier for outputting a laser beam signal and a power amplifier guiding multiple-transverse modes where the numerical aperture of the power amplifier is greater than the numerical aperture of the oscillator or preamplifier.

Referring now to FIGS. 1 to 12, a cladding pumped multi-mode fibre laser is shown.

Figure 1A:
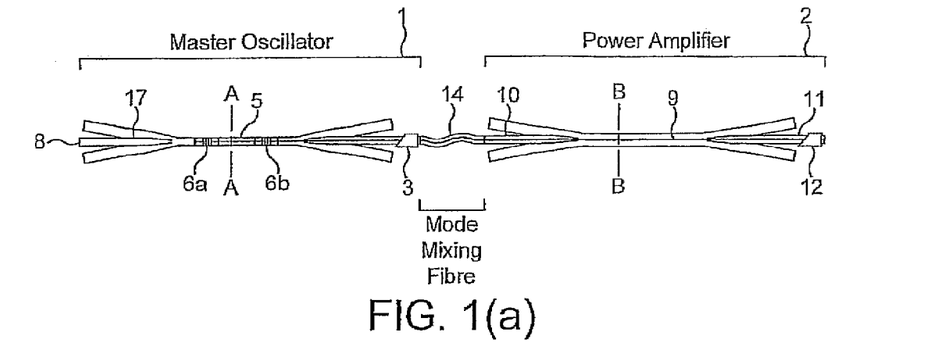
FIG. 1(a) shows a cladding pumped laser arrangement.
Figure 1B:
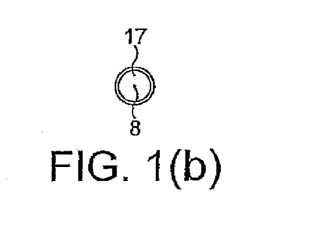
FIG. 1(b) shows a cross-section through A-A of FIG. 1(a)
Figure 1C:
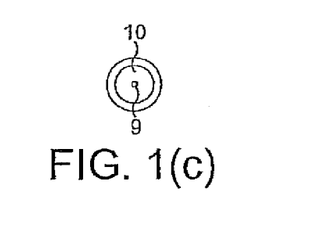
FIG. 1(c) shows a cross-section through B-B of FIG. 1(a)

Referring to FIG. 1, an optical fibre laser in accordance with the first embodiment of the invention is a master oscillator, power amplifier configuration. As shown in FIG. 1, the laser generally comprises a master oscillator 1 and a power amplifier 2 connected via a cladding mode stripper 3 and a mode-mixing fibre 4. The master oscillator is arranged to generate a laser output and typically might be of fairly low power such as about 50-200 watts output. This power output is amplified in the power amplifier to give a total output power of about 250-1000 watts in one embodiment, although these figures may vary.

The master oscillator 1 comprises a linear laser cavity constructed of optical fibre. This is more clearly shown in FIG. 2. The gain medium is a rare-earth-doped cladding pumped optical fibre typically supporting a single transverse mode or a few transverse modes in its core. The material of the fibre may be doped with any suitable rare earth element, such as Nd, Yb or other material or combination of materials, and the choice of material can determine the frequency at which the fibre lasers. This material forms the cores (8 and 9) of the active fibres (5 and 11). Fibre Bragg gratings 6a, 6b are formed into lengths of normally un-doped optical fibre joined to the ends of the active fibre in known manner to form cavity end reflectors. This is standard for many optical fibre lasers. Pumping light is introduced into the inner cladding 17 of the gain fibre via fused fibre pump combiners 7. In the active gain fibre 5, the pumping light is used to excite rare earth atoms in the doped core out of their equilibrium atomic states to produce a population inversion and hence generate a laser beam. Pump light can be introduced into either or indeed both ends of the fibre laser via fused pump combiners to increase the total power of the laser. The laser light exits the laser through a fused pump combiner with a signal feed-through and is transmitted through a mode-mixing fibre 4 (as will be described further below) to the power amplifier 2 where it is further amplified.

The master oscillator is preferably operated on a single transverse mode. Alternatively, when the fibre supports more than one transverse mode, the higher order modes are suppressed using standard techniques such as tight coiling of the fibre, which techniques are well known to those skilled in the art.

The power amplifier comprises a cladding pumped optical fibre with a deliberately multi-mode core 9 and a large diameter inner cladding 10. Pumping light is introduced into inner cladding 10 and used to amplify the laser light in the core 9 which is then output through fibre 11 and subsequently through a further cladding-mode stripper 12.

The diameter of the core and of the inner cladding of the power amplifier are respectively greater than the diameter of the core and inner cladding layer 7 of the master oscillator. In a typical embodiment, the core of the master oscillator may be from about 5 to about 30 µm in diameter and the numerical aperture of the core would be typically in the range 0.06 to 0.15. The outer diameter of the inner cladding layer of the master oscillator may then lie in the approximate range 130 to 400 µm. The outer cladding would typically consist of a coating of a low-refractive-index polymer with typical n=1.38 making the numerical aperture of the pump waveguide around 0.45. The diameter of the core of the power amplifier may then be around 50 to 75 µm and the numerical aperture in the range 0.06 to 0.15. The diameter of the inner cladding may be around 800 to 1000 µm, for example, although these ranges are not limiting. The outer cladding would typically consist of a coating of a low-refractive-index polymer with typical n=1.38 making the numerical aperture of the pump waveguide around 0.45. This configuration also enables the master oscillator to be pumped with lower power (lower brightness) pump sources since its output need not be as high as is the case with previous purely single mode fibre lasers.

Figure 18:
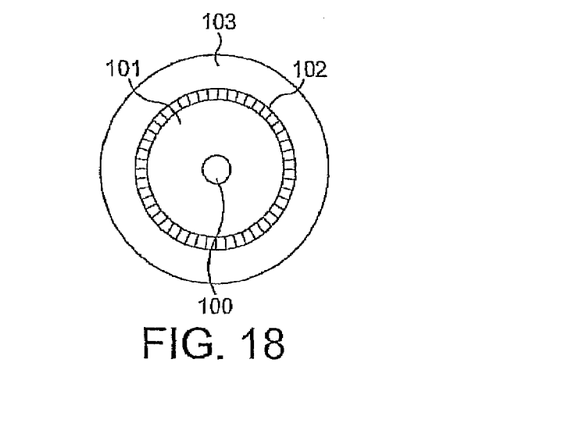
FIG. 18 shows an air clad double clad optical fibre for use in an alternative master oscillator-power amplifier configuration to that of FIGS. 6 to 11.

Optionally, the inner cladding waveguide may comprise an air clad structure of the type shown in FIG. 18. This has a signal core 100, a glass region 101 surrounding the core forming the inner cladding, a ring of holes 102 which form the outer cladding, and an outer solid glass region 103. Such air clad double clad optical fibres are well known in themselves. Multi-mode pump light propagates in the inner cladding region 101 guided by the outer ring of holes 102. These outer holes form the "air outer cladding" of the pump waveguide. The use of such an air clad fibre enables the numerical aperture of the pump waveguide to be increased. As described above, brightness=power/(area×(NA$^2$)). Thus, an increase in numerical aperture NA of a pump waveguide by a factor of the square route of 2 is equivalent to doubling the cross-sectional area of the pump guide in terms of acceptance of a given pump brightness. Conventionally, a pump waveguide NA is largely determined by the refractive index of the outer polymer cladding (typically around 1.38) which results in pump waveguide NAs of around 0.45. Using an air cladding type optical fibre can increase the NA of the pump waveguide to 0.6 or higher. This is roughly equivalent to a 33% increase in inner cladding diameter.

A transition is made from the single or low order mode master oscillator to the power amplifier via a section of mode-mixing multi-mode fibre 4 preceded by a cladding mode stripper. In the forward direction, the mode-mixing optical fibre has the effect of filling the aperture of the multi-mode fibre which can be advantageous for the performance of the multi-mode amplifier. In the reverse direction, any light entering the mode-mixing optical fibre from the direction of the power amplifier will also be re-distributed to fill the aperture of the mode-mixing fibre. On arriving at the transition to the single-mode (or near single mode) fibre the majority of the light will couple into the cladding and be removed by the cladding mode stripper shown in FIG. 5. The degree of optical isolation thus achieved is approximately equal the ratio of the number of modes supported by the mode-mixing optical fibre and the single or (near single mode) fibre.

Figure 3:
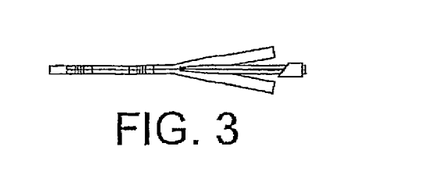
FIG. 3 shows an alternative embodiment of a master oscillator.
Figure 4:
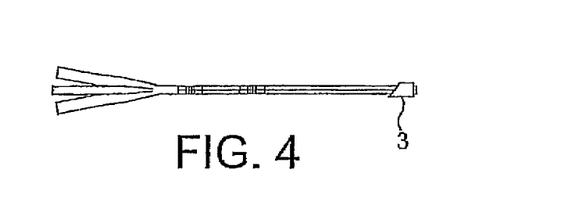
FIG. 4 shows a yet further alternative embodiment.
Figure 5:
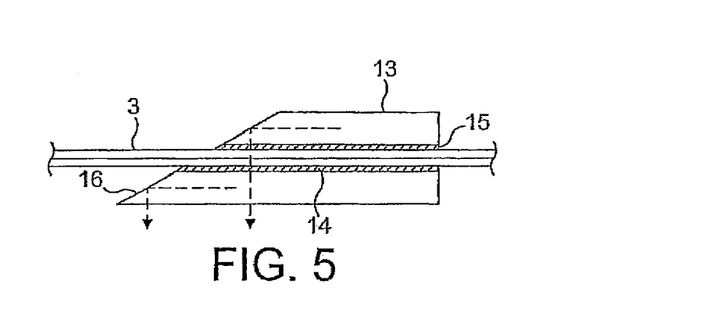
FIG. 5 shows a cladding-mode stripper.

The cladding mode stripper comprises a capillary 13 of glass or other material mounted adjacent to and coaxial with the cladding of the fibre and connected thereto by a transparent interface material 14. The stripper has one end 15 which is generally perpendicular to the longitudinal direction of the fibre and its other end 16 which is proximal to the master oscillator and which is slanted at an angle (typically around 45°) to the longitudinal axis. The angle and material of the stripper are chosen so that any radiation that finds its way into the cladding mode stripper 13 in the rearwards direction will be totally internally reflected at the surface 16 and be redirected outwards. The embodiments shown in FIGS. 3 and 4 show pumping of the master oscillator in the forward and reverse directions respectively, whereas the embodiment of FIG. 1 shows pumping in both forward and reverse directions simultaneously. The purpose of these embodiments can be to improve the efficiency of the laser or it may simply be a matter of technological convenience. Bidirectional pumping permits a greater amount of pump power (of a given brightness) to be introduced into the active optical fibre than uni-directional pumping.

Figure 6:
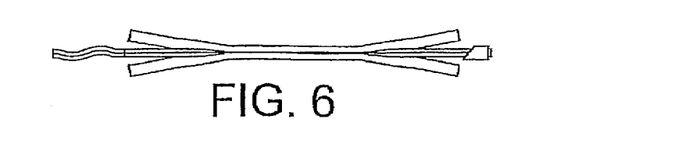
FIG. 6 shows a first embodiment of a power amplifier.
Figure 7:
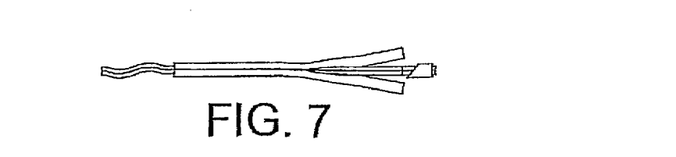
FIG. 7 shows a second embodiment of a power amplifier.
Figure 8:
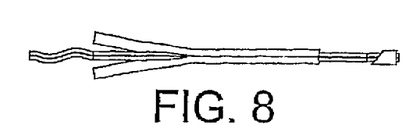
FIG. 8 shows a third embodiment of a power amplifier.

Similarly, FIGS. 7 and 8 show alternative embodiments for the power amplifier in which forward and reverse direction pumping is used (FIG. 6 shows pumping in both directions).

Figure 2:
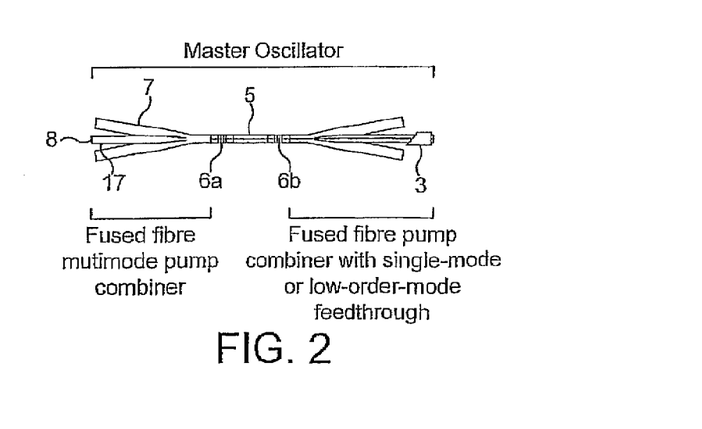
FIG. 2 shows a master oscillator.
Figure 9:
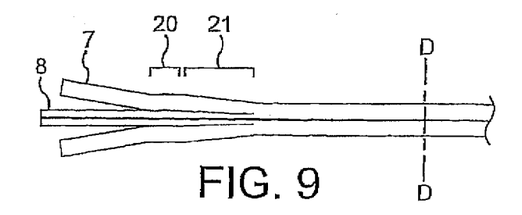
FIG. 9 shows a fused fibre pump combiner.
Figure 10:
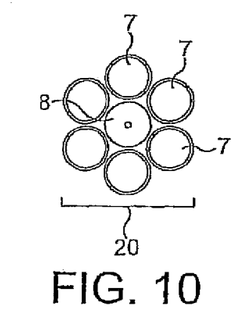
FIG. 10 shows a cross-section through the combiner in region 20.

FIG. 9 shows how the fused fibre multi-mode pump combiner of FIG. 2 (i.e., of the oscillator) may be formed. Such combiners are shown, for example, in U.S. Pat. No. 5,864,644. The pump combiner comprises a bundle of seven optical fibres with the central optical fibre optionally having a non-rare-earth-doped core which can be a multi-mode or low-order-mode core. This is shown by the collection of fibres 7 around the central fibre 8 of FIG. 10 forming bundle 20. Such combiners are well known and variations with different fibre counts (e.g. 19 fibres) are possible. The multimode fibres surrounding the central fibre receive pump energy from a semiconductor laser or other means (not shown). Moving towards the right end of FIG. 9, this bundle is fused into a tapered section 21 to form a single fibre with substantially circular cross-section and diameter approximately equal to that of fibre 5. At this point it is joined to a length of un-doped optical fibre normally with similar dimensions, core and cladding geometry to fibre 5. This fibre forms the output of the fused pump combiner. It should be noted that this output fibre comprises a core 22, an inner cladding layer 23 and an outer (pump) cladding 24. The interface between the inner cladding and outer cladding layer 24 need not be circular as shown but may be faceted in cross-section. This faceted construction may also be used with various other parts of the laser construction, as is shown in various cross-sectional views, and this is advantageous for mode-mixing for example.

Figure 11:
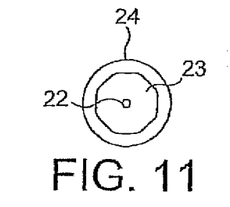
FIG. 11 shows a cross-section through the fused fibre pump combiner through D-D of FIG. 9.

FIG. 11 shows a cross-section of section 21 of FIG. 9, illustrating the core 22, inner cladding 23 and outer cladding.

Figure 12A:
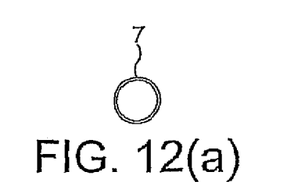
FIG. 12(a) shows a cross-section through a multimode pump delivery fibre
Figure 12B:
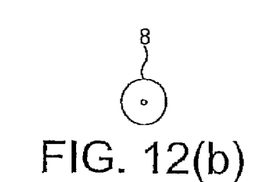
FIG. 12(b) shows a cross-section through the (normally central) signal-carrying fibre in the fused pump combiner.

FIG. 12(a) shows a cross-section through a multimode pump delivery fibre 7 and FIG. 12(b) shows a cross-section through the central fibre 8 having a core waveguide that guides the laser signal through the pump combiner.

The fibre lasers described are provided with pumping energy, generally from laser diodes. The embodiments of FIGS. 1 to 11 show a continuous wave (CW) laser. Alternatively, the same master oscillator-power amplifier configuration can be used to achieve pulse operation by modulation of the fibre laser oscillator (master oscillator). This modulation can be effected by modulation of the pumping means, eg modulation of the pump diodes. In this configuration representative power levels could be 250-500 W average power and greater than 1 kW peak power. In this case, the core and cladding dimensions may be substantially the same as those of the CW laser described above. The ability to pulse the laser at high average and peak powers is another desirable consequence of the enlarged core of the power amplifier. The enlarged core reduces the intensity of the light in the core and avoids the onset of detrimental non-linear effects such as stimulated Brillouin scattering which are intensity-dependent.

FIGS. 13 to 17 show an alternative embodiment in the form of a pulsed laser. This laser consists of a master oscillator power amplifier configuration. The master oscillator 30 typically has a relatively low output power and this is amplified in the pre-amplifier section 31 to give a higher total output power. Typical power levels are 5-10 watts output from the master oscillator and about 20-40 watts total output power from the laser.

Figure 13A:
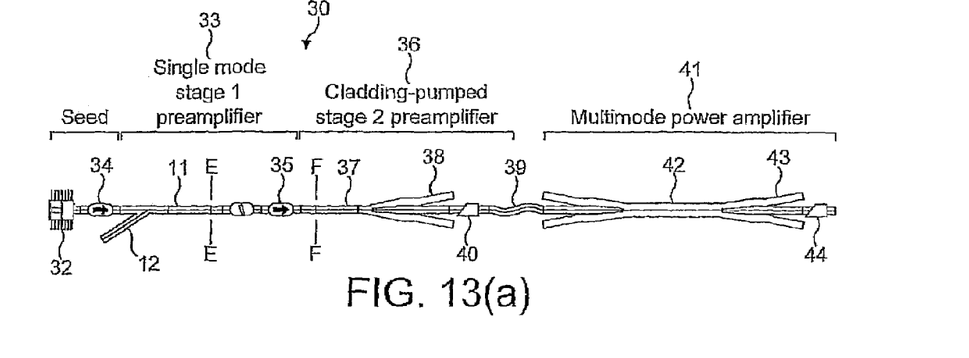
FIG. 13(a) shows a fibre laser seeded with a modulated semiconductor laser diode.

The master oscillator 30 comprises a directly modulated fibre coupled semiconductor laser diode 32 with a peak output power of typically a few hundred mW. This is amplified in a multi-stage single mode or low-order-mode preamplifier chain with interstage isolation and band pass filtering. This comprises a single mode stage one preamplifier 33 receiving an input from the laser diode 32 via a fibre coupled Faraday isolator 34. The preamplifier includes a single mode rare earth doped optical fibre 11 which is pumped via a fused fibre pump signal multiplexer 12. The output from this is passed through a further fibre coupled Faraday isolator 35 to a cladding pump stage 2 preamplifier 36. This comprises a cladding pumped optical fibre 37 with single mode or low-order-mode core and is pumped by a multimode pumped delivery fibre 38.

The output from the preamplifier stage is applied through a mode mixing fibre 39 with cladding isolator 40 (similar to that of the embodiments of FIGS. 1 to 12) to a multimode power amplifier 41.

This power amplifier 41 comprises a large diameter cladding pumped optical fibre 42 with a multimode rare-earth-doped core. This is a deliberately multimode core and has a large diameter cladding. Representative core parameters are 100 micron diameter with a numerical aperture of 0.08. A representative inner cladding diameter is 800 microns. This is pumped via a further multimode pump delivery fibre 43.

The multimode power amplifier 41 is therefore generally similar to the power amplifier of the FIGS. 1 to 12 embodiment. The cross-section of the large diameter cladding pumped optical fibre is similar, typically having a non-circular inner cladding. In the power amplifier 41 the signal is amplified to give, as described earlier, a total output power which may be, for example, about 20-40 watt, and this is applied through a cladding mode stripper 44 to an output where it is usable.

Figure 13B:
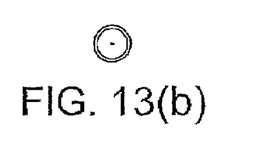
FIG. 13(b) shows a cross-section through E-E of the single-mode active amplifying fibre shown in FIG. 13(a)
Figure 13C:
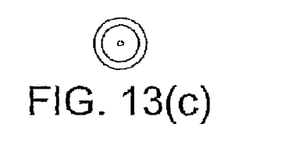
FIG. 13(c) shows a cross-section through F-F of the a single-mode or low-order-mode amplifying fibre shown in FIG. 13(a)

FIG. 13(*b*) shows a cross-section through the optical fibre of the single mode stage 1 preamplifier 33 and FIG. 13(*c*) shows a cross-section through the cladding pump stage 2 pre-amplifier.

The outer cladding of the multimode power amplifier 41 typically consists of a coating of low refractive index polymer giving an inner cladding numerical aperture of around 0.45. Optionally, the outer cladding could comprise an air clad fibre, of the type described with reference to FIG. 18.

Again, the larger cladding diameter formed in this embodiment of the present invention permits the use of lower brightness pump laser sources which are typically considerably less costly than higher brightness equivalents.

Figure 14:
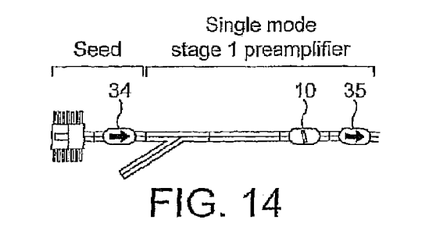
FIG. 14 shows a single mode seed diode and first stage preamplifier.

FIG. 14 shows the single mode stage 1 preamplifier of FIG. 13 in a little more detail. It should be noted that this amplifier further includes an optical band path filter 1 0. The purpose of this is to remove unwanted amplified spontaneous emission (ASE) from at the output of the amplifier. ASE is broadband spontaneously emitted light that degrades the single to noise ratio of the pulsed signal. That portion of the ASE that lies outside the signal wavelength band can be removed by optical bandpass filtering—improving the signal to noise ratio and hence contrast ratio of the modulated signal.

Figure 15:
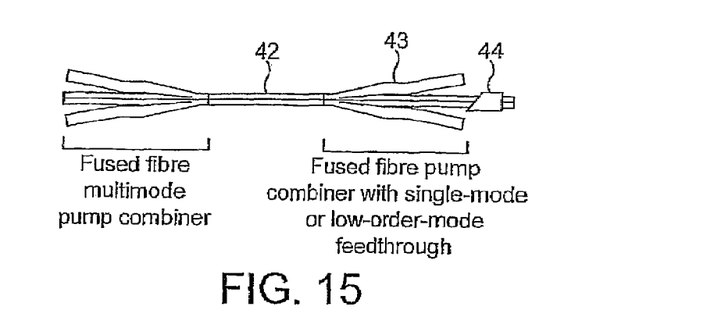
FIG. 15 shows a single-mode or low-order-mode second stage cladding-pumped preamplifier.
Figure 16:
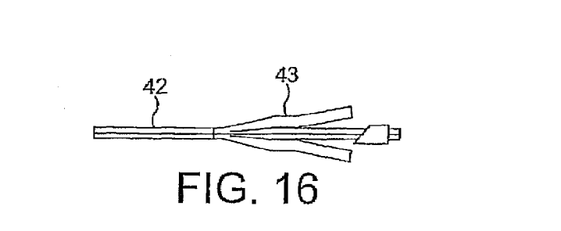
FIG. 16 shows an alternative embodiment of a single-mode or low-order-mode cladding-pumped second stage preamplifier.
Figure 17:
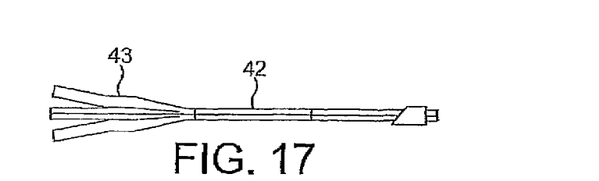
FIG. 17 shows yet another alternative embodiment of a single-mode or low-order-mode cladding-pumped second stage preamplifier.

FIGS. 15 to 18 show three exemplary embodiments of the cladding pump stage 2 preamplifier. Note that other examples may be used but these are just three embodiments shown by way of example. FIG. 15 shows an example having a fused fibre multimode pump combiner at the end proximal to the single mode stage 1 preamplifier 33 and a fused fibre pump combiner with single mode or low-order-mode feed through at the distal end. FIGS. 16 and 17 show alternative embodiments using forward and reverse pumping.

Again, the transition from single mode master oscillator to the multimode power amplifier takes place through a section of mode mixing optical fibre 39 preceded by a cladding mode stripper 40. This has the same purpose as that of the embodiment of FIGS. 1 to 12 and mode mixing may be achieved in any desirable way.

In embodiments of the invention, the output of the power amplifier may be applied to a workpiece via a fibre having larger core diameter than that of the power amplifier. This provides optical isolation for the laser against back-reflection of light from the workpiece into the core during materials processing.

The output of the master oscillator may be modulated by direct modulation of the pump laser diode (which supply the pump energy to the pump cladding), resulting in a pulsed laser output.

What is claimed is:

1. A fibre laser comprising a single mode or low-order-mode cladding pumped fibre laser oscillator or preamplifier, and a cladding pumped fibre laser power amplifier adapted to guide multiple transverse modes, wherein an output from the oscillator or preamplifier is applied through a mode mixing means to the power amplifier to provide that a laser signal of the cladding pumped fibre laser power amplifier is emitted from the fibre laser power amplifier in the multiple transverse modes.

2. A fibre laser as claimed in claim 1, wherein the mode mixing means includes a mode mixing fibre and a cladding mode stripper.

3. A fibre laser as claimed in claim 2, wherein the cladding mode stripper comprises a capillary mounted coaxially and adjacent the mode mixing fibre and has an end proximal to the single or low-order-mode oscillator or preamplifier which is adapted to use total internal reflection to redirect radiation in the stripper away from the fibre.

4. A fibre laser as claimed in claim 1, wherein the oscillator or preamplifier includes a core, an inner cladding and an outer cladding, and the power amplifier includes a core and an inner cladding defining a waveguide for the laser signal, and an outer cladding defining a waveguide for pumping energy, wherein the core and inner cladding diameter of the power amplifier are respectively larger than the core and inner cladding of the oscillator or preamplifier.

5. A fibre laser as claimed in claim 1, wherein the mode mixing means includes a mode mixing fibre having a core and cladding, the core having a non-circular cross-section.

6. A fibre laser as claimed in claim 1, wherein the mode mixing means is a fibre having at least one coil or bend along its length to induce mode mixing.

7. A fibre laser as claimed in claim 1, wherein the oscillator or preamplifier comprises a fibre having a core, an inner cladding and an outer cladding defining separate waveguides for the laser signal and pump light respectively, the inner cladding having a non-circular cross-section to promote mixing of pump modes.

8. A fibre laser as claimed in claim 7, wherein a fused fibre pump combiner is used to introduce multimode pumped light into the inner cladding of the fibre.

9. A fibre laser as claimed in claim 1, wherein pump energy is introduced in a forward, reverse or in both forward and reverse directions.

10. A fibre laser as claimed in claim 1, in which the optical fibre in the power amplifier includes an inner cladding with a non-circular cross-section to promote mixing of pump modes.

11. A fibre laser as claimed in claim 1, wherein a fused fibre pump combiner having a multimode core feed through is used to multiplex and demultiplex pump light and the laser signal.

12. A fibre laser as claimed in claim 1, wherein the power amplifier has an output which is applied through an optical fibre having a larger core diameter than that of the power amplifier.

13. A fibre laser as claimed in claim 1, wherein the oscillator has an output which is modulated by direct modulation of pump laser diodes.

14. A fibre laser as claimed in claim 1, which is a pulsed laser amplified in a chain of one or more preamplifiers before a master amplifier.

15. A fibre laser as claimed in claim 1, wherein said fibre laser further includes a power amplifier adapted to guide multiple-transverse modes formed by an active fibre having a core and an inner cladding defining a waveguide for the laser signal, and an outer cladding defining a waveguide for pumping energy; wherein the core and inner cladding diameter of the power amplifier are substantially larger than the core and inner cladding of the oscillator.

16. A fibre laser comprising a single mode or low-order-mode cladding pumped fibre laser oscillator or preamplifier, and a cladding pumped fibre laser power amplifier adapted to guide multiple transverse modes, wherein an output from the oscillator or preamplifier is applied through a mode mixing means to the power amplifier in a forward direction, and any light entering the laser oscillator or preamplifier from a reverse direction that is substantially opposite the forward direction, is removed by a cladding mode stripper.

17. The fibre laser as claimed in claim 16, wherein said mode mixing means includes a mode mixing fibre.

18. The fibre laser as claimed in claim 16, wherein the light entering the mode mixing means from the reverse direction is re-distributed to fill the aperture of the mode mixing fibre prior to being removed by the cladding mode stripper.

19. A fibre laser comprising a fibre having a first portion, a second portion and a third portion, said first portion including a single mode or low-order-mode cladding pumped fibre laser oscillator or preamplifier, said second portion including a mode mixing fibre, and said third portion including a cladding pumped fibre laser power amplifier including multiple transverse modes, wherein said mode mixing fibre distributes a single mode or low-order mode signal among the multiple transverse modes of the cladding pumped fibre laser power amplifier.

20. The fibre laser as claimed in claim 19, wherein said second portion further includes a cladding mode stripper for preventing any light entering the laser oscillator or preamplifier in a reverse direction from the laser oscillator or preamplifier.

* * * * *

UNITED STATES PATENT AND TRADEMARK OFFICE
CERTIFICATE OF CORRECTION

PATENT NO. : 7,649,914 B2  Page 1 of 1
APPLICATION NO. : 12/060444
DATED : January 19, 2010
INVENTOR(S) : Steffan Lewis It is certified that error appears in the above-identified patent and that said Letters Patent is hereby corrected as shown below:

In Col. 2, line 51 please delete "kiwould" and replace with "than would"

Signed and Sealed this

Sixteenth Day of March, 2010

David J. Kappos
*Director of the United States Patent and Trademark Office*